United States Patent [19]

Matsumoto

[11] Patent Number: 4,576,243
[45] Date of Patent: Mar. 18, 1986

[54] METHOD AND APPARATUS FOR WEIGHING BULK MATERIALS

[75] Inventor: Masato Matsumoto, Osaka, Japan

[73] Assignee: Automatic Mechanical System Engineering Co., Osaka, Japan

[21] Appl. No.: 604,764

[22] Filed: Apr. 27, 1984

[30] Foreign Application Priority Data

| Dec. 13, 1983 [JP] | Japan | 58-236576[U] |
| Dec. 13, 1983 [JP] | Japan | 58-193469[U] |
| Dec. 22, 1983 [JP] | Japan | 58-198015[U] |
| Dec. 22, 1983 [JP] | Japan | 58-198016[U] |

[51] Int. Cl.⁴ .................. G01G 13/02; G01G 19/22; G01G 23/14
[52] U.S. Cl. .................. 177/119; 177/70; 177/165; 177/1; 222/55
[58] Field of Search .............. 177/70, 119, 120, 121, 177/165, 1; 222/55, 56, 135; 414/323, 414

[56] References Cited

U.S. PATENT DOCUMENTS

| 2,732,164 | 1/1956 | Legrow et al. | 177/119 X |
| 2,904,304 | 9/1959 | Zwoyer et al. | 177/119 X |
| 3,217,943 | 11/1965 | Atwood | 222/55 X |
| 3,362,585 | 1/1968 | Nessim et al. | 222/55 |
| 3,662,923 | 5/1972 | Spanton et al. | 222/55 |
| 3,834,474 | 9/1974 | Knol | 177/210 X |
| 4,348,852 | 9/1982 | Clancy | 222/55 X |
| 4,418,773 | 12/1983 | Finet et al. | 177/165 X |

FOREIGN PATENT DOCUMENTS 436658 10/1935 United Kingdom ............... 177/119

Primary Examiner—E. A. Goldberg
Assistant Examiner—Patrick W. Foster
Attorney, Agent, or Firm—Armstrong, Nikaido, Marmelstein & Kubovcik

[57] ABSTRACT

Bulk materials are supplied on to a conveyor one after another with the supply port filled with the material. Since the pressure applied to the conveyor surface by the material is constant, what is called the fall error is eliminated. In one embodiment the conveyor is moved while in another embodiment the material is carried by scrapers secured to a chain conveyor.

8 Claims, 25 Drawing Figures

METHOD AND APPARATUS FOR WEIGHING BULK MATERIALS

The present invention relates to a method and an apparatus for weighing bulk materials.

For the preparation of e.g. fodder, various bulk materials such as soybeans are weighed and then mixed together. For this purpose, it has been a common practice as shown in FIG. 1 to use a screw conveyor 1 to feed a bulk material from a storage bin (not shown) to a hopper 1 provided with a weigher. The screw conveyor 1 is stopped when a predetermined value is detected by the weigher. At the moment when the screw conveyor 1 is stopped, some of the material is still falling from the supply port of the screw conveyor 1 toward the surface of the material stacked in the hopper 2. Some error is caused by this falling material because when it reaches the surface of the material stacked in the hopper 2, the weight of the material in the hopper 2 will exceed the predetermined value by the weight of the above-mentioned falling material. This is what is called the fall error. This error has so far been compensated by, e.g., taking this error into consideration beforehand. However, this way of compensating the error is not satisfactory in accuracy because the height of the material stacked in the hopper 2 is not constant. Another trouble is that even after the stoppage of the screw conveyor 1, some of the material is additionally discharged by inertia from the discharge port of the screw conveyor 1.

If several kinds of bulk materials stored in separate material tanks 3 have to be put one after another into the hopper 2 and weighed as shown in FIG. 2, still another problem arises from the complicated arrangement of the material tanks 3 and the conveyors 1 for feeding the materials to the hopper 2. In order to eliminate the disadvantages described above, it has already been proposed as shown in FIG. 3 to provide material tanks 3 along a belt conveyor 4 and provide each tank with a weigher so as to weigh each of several kinds of bulk materials separately before it is fed to the conveyor 4. Even in this arrangement, however, the above-mentioned error caused by the falling material remains unsolved. Furthermore, this arrangement proves to be expensive because it requires a plurality of weighers.

It is an object of the present invention to provide a method and an apparatus for weighing a plurality of bulk materials in which the above-mentioned fall error is eliminated.

According to the present invention, the discharge ports of the material tanks are disposed near the conveying surface of a conveyor scale, to which the materials to be weighed are fed until the discharge or supply port is blocked by the material itself. The material remaining above the discharge port exerts a constant pressure on the conveyor surface. When the conveyor is driven in this condition, additional material is allowed to fall to the conveyor surface. Then the empty weight of the conveyor plus the weight of the material stacked on the conveyor surface is weighed. When the weight of the material stacked on the conveyor surface has come up to a predetermined value, the discharge port is closed in a moment so that the material will not be discharged any more.

Because the material is fed on to the conveyor surface of the conveyor scale while the conveyor is moving, the error caused by the falling material is eliminated and accuracy in weighing can be enhanced. The time required for weighing can be reduced because the material is weighed while it is carried.

With the object described above in view and as will become apparent from the following detailed description, the present invention will be more clearly understood in connection with the accompanying drawings, in which:

BRIEF DESCRIPTION OF THE DRAWINGS

Referring now to FIGS. 4 and 6 a conveyor scale includes a belt conveyor 10 supported by a suitable number of load cells 11. The total of values obtained by the load cells 11 indicates the empty weight of the conveyor 10 plus the weight of a material A (FIG. 7) to be weighed. Since the empty weight of the conveyor 10 is a constant, the weight of the material stacked on the conveyor surface is obtained by subtracting the empty weight of the conveyor 10 from the above-mentioned total of values. To keep the load cells 11 unaffected by the vibration of the conveyor 10, a vibration-proof rubber may be interposed between the conveyor 10 and the load cells 11.

As shown in FIG. 4, a plurality of material tanks 12 are disposed along the conveyor 10. The lower portion of each tank 12 is in the shape of a hopper, the lower end of which is formed into a discharge pipe 13 extending to a discharge or supply port 14. The length of the discharge pipe 13 may be experimentally determined so that the material remaining above the discharge port 14 may exert a constant pressure P (FIG. 7) on the conveyor surface. By way of example, the discharge pipe 13 has a length-to-diameter ratio or 2.5 to 3.0 or more.

Referring now to FIGS. 5 to 7, a box-shaped covering 15 extending over the full length of the conveyor 10 is mounted on its upper surface with its opening facing downwardly. The discharge pipes 13 are connected to the top face of the covering 15 and supported by frame plates 17. The discharge port 14 is constituted by the lower opening of each pipe 13 and provided with a pneumatically or hydraulically driven slide damper 16, which is opened and closed by controller 20, FIG. 7, on the basis of values obtained by the load cells 11. The arrangement of the discharge ports 14, hence of the slide dampers 16, depends on the size of each tank 12, etc. Several examples of the arrangement are shown in FIG. 8. The whole apparatus is mounted on a foundation 18.

Figure 5:
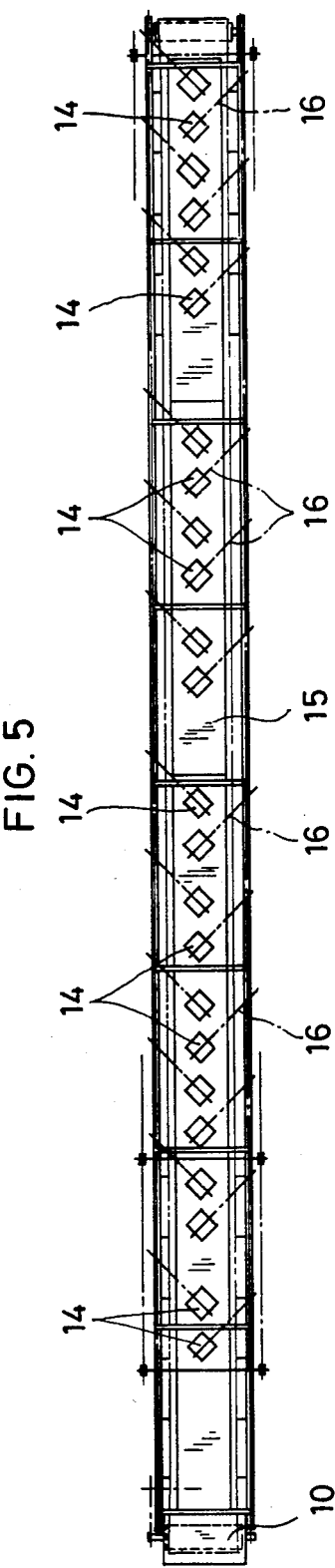
FIG. 5 is a plan view thereof with the tanks omitted.
Figure 6:
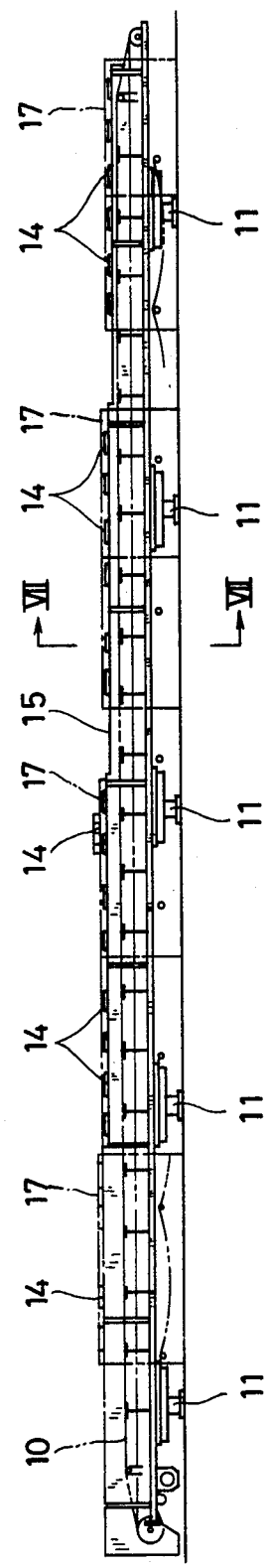
FIG. 6 is a front view thereof.
Figure 7:
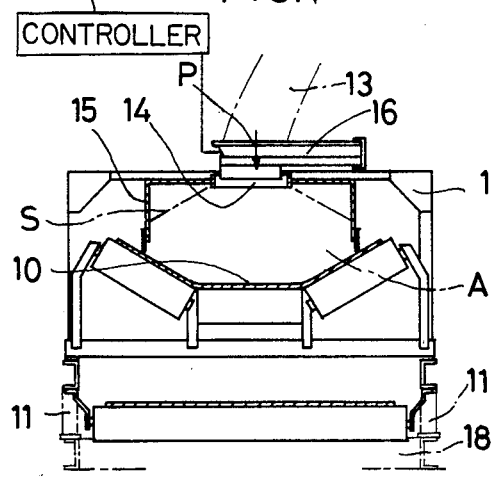
FIG. 7 is a sectional view taken along line VII—VII of FIG. 6.
Figure 8A:
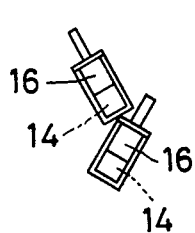
FIGS. 8a, 8b, 8c, and 8d are diagrams explaining the arrangement of exhaust ports.
Figure 8B:
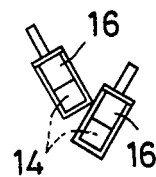
Figure 8C:
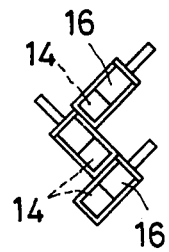
Figure 8D:
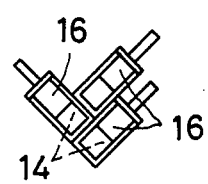

In operation, when the slide damper 16 disposed at the start side end of the conveyor 10 (at the right-hand end in FIG. 5) is opened, the material to be weighed falls through the discharge port 14 and is stacked on the conveyor 10 as shown by dot-dash lines in FIG. 7. The material stops flowing down when it blocks up the discharge port 14.

When the conveyor 10 is driven, the discharge port 14 gets unblocked and additional material is allowed to fall on to the conveyor 10. As long as the conveyor 10 moves, the material continues to be supplied from the discharge port 14. But, no space is formed over or under the discharge port. The empty weight of the conveyor 10 plus the weight of the material stacked on the conveyor surface is weighed by the load cells 11. The weight of the material stacked on the conveyor surface is obtained when the empty weight of the conveyor 10 and the constant pressure P exerted by the material remaining above the discharge port 14 are subtracted from the total of values obtained by the load cells 11.

The slide damper 16 closes and the conveyor 10 stops when the weight of the material stacked on the conveyor surface has come up to a predetermined value. When the conveyor 10 has stopped, the tension side of the conveyor 10 slackens and the material stacked thereon gets out of touch with the slide damper 16. Consequently, the material remaining above the discharge port 14 no longer exerts pressure P on the conveyor surface, and the material stacked on the conveyor surface can now be accurately weighed. In case of short weight, the slide damper 16 is opened and additional material is allowed to fall on to the conveyor 10. A slide damper 16 with an adjustable opening will enhance accuracy in weighing.

A slide damper 16 adapted to close in the same direction as the material conveying direction and at a higher speed than the material conveying speed will also enhance accuracy in weighing, because the slide damper 16 stops the discharge of the material from the discharge port 14 at the moment when it begins to close.

The quantity of the material discharged from the discharge port 14, which is determined by the cross-sectional area of the space defined by the covering 15 and the conveyor 10, can be roughly calculated on the basis of the distance for which the conveyor belt has travelled. This can be utilized to attain accuracy and speediness in weighing. For this purpose, the conveyor belt is driven at a higher speed until a certain amount of the material e.g., 95% of the quantity determined by the cross-sectional area of the above-mentioned space, is discharged and then the conveyor belt is slowed down.

Figure 9:
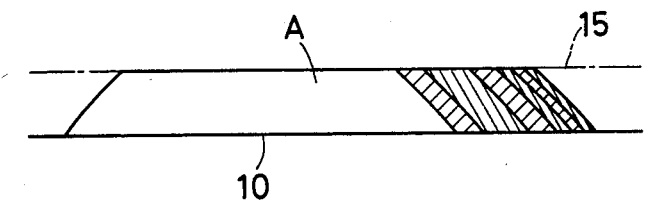
FIG. 9 is a schematic illustration showing how the materials are stacked on a conveyor when the weighing process is completed.

A series of slide dampers 16 are opened and closed one after another and the weighing process is repeated each time a material is stacked on the rear slope of the preceding material as shown in FIG. 9. When all the weighing processes have been completed, the materials are fed to a mixer for mixing or to a truck.

Time required for weighing can be reduced by starting the next series of weighing processes before the completion of the feed of materials to the mixer, etc. However, timing should be set so that the first weighing in the next series of weighing processes will not be finished before the completion of the feed of materials to the mixer, etc.

It goes without saying that various other types of weighing means may be used in place of the load cells 11.

Figure 10:
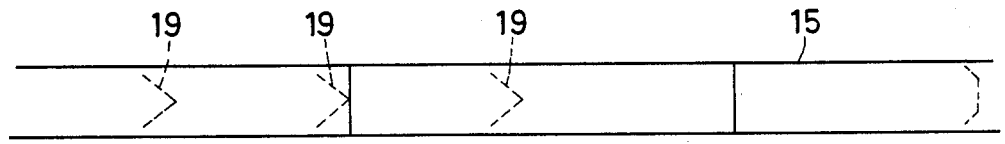
FIGS. 10 and 11 are a schematic plan view and a schematic front view illustrating another method of weighing the materials.
Figure 11:
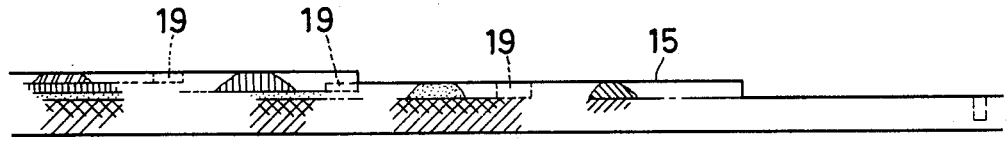
Figure 12:
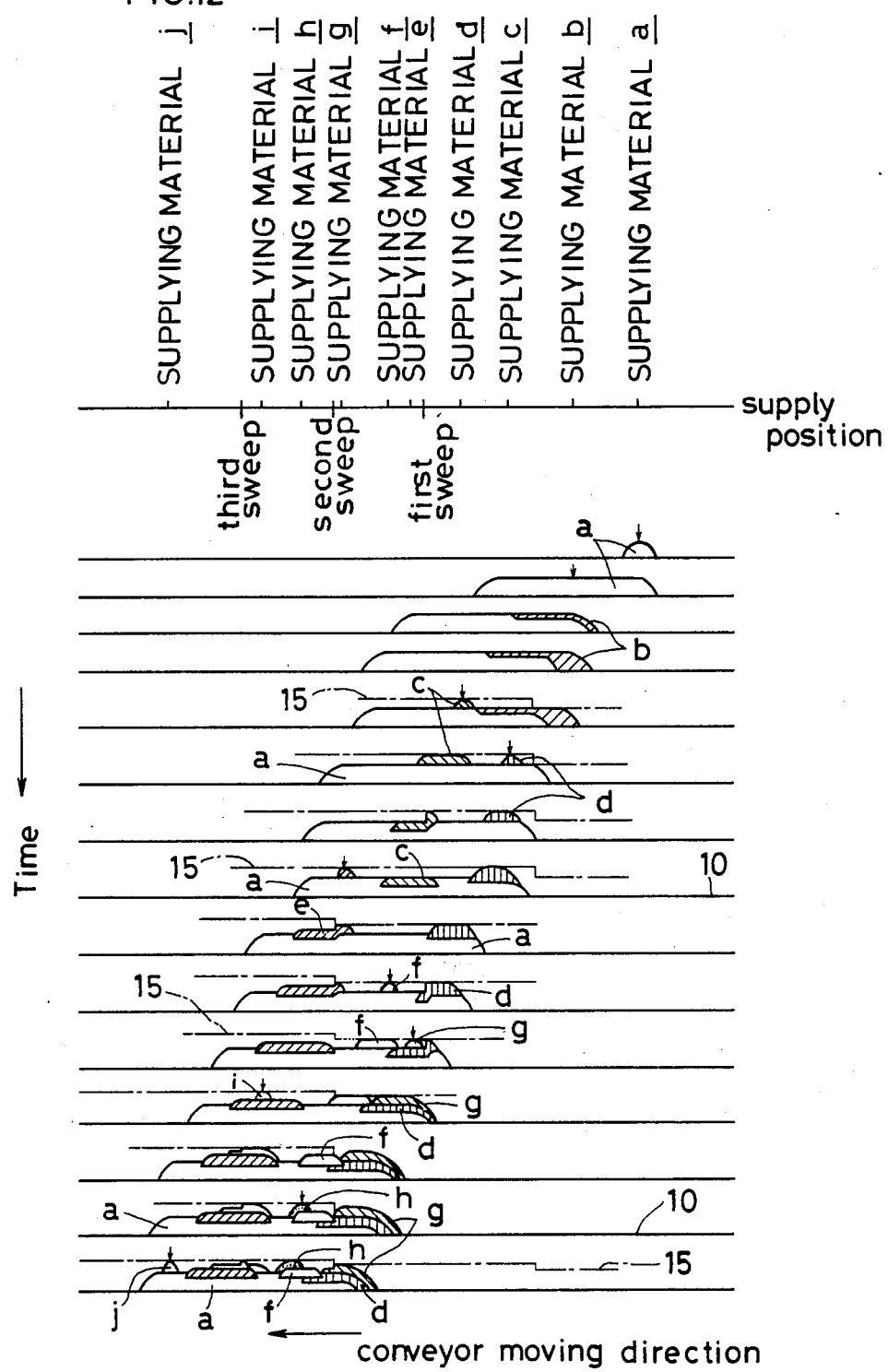
FIG. 12 is a diagram showing how different materials are stacked in the method.

Referring now to FIGS. 10 to 12, another embodiment of the present invention includes a covering 15 having a terraced top face ascending leftwardly in FIG. 11 and a plurality of V-shaped sweeping boards 19 provided on the under surface of the top board of the covering 15, so that the materials to be mixed can be stacked not only on the rear slope of the preceding material but also on top thereof.

In operation, the conveyor 10 stops when the weight of a first material a stacked on the conveyor surface has come up to a predetermined value. Thereby a space is left between the top of the material a and the under surface of the top board of the covering 15. After the material a has been weighed, a second material b supplied on top of the material a is allowed to pass the space and cover the side slopes S (FIG. 7) of the conveyor 10, and stacked on the rear slope thereof as shown in FIG. 12.

When the second material b has been weighed, the compound materials a and b are disposed in a position where the covering 15 is a tier higher up. A third material c is discharged from the discharge port 14 provided in the above-mentioned portion of the covering 15. When the third material c has been weighed, a fourth material d is discharged thereon, weighed, and swept down on the side and rear slopes of the compound materials by one of the sweeping boards 19.

Materials e, f, g, h, i and j are also weighed in the same manner and mixed together with the materials a to d to some degree on the conveyor surface. Therefore, the time required for mixing the materials by a mixer in the subsequent process can be reduced. Also, since one material is supplied on top of another, only a small quantity of a material falls from the discharge port 14. Therefore, this embodiment is of advantage to the weighing of a small quantity of material.

The travel speed of the conveyor belt may be determined in accordance with the quantity of each material to be supplied. For example, the first material a supplied in a large quantity is carried at an initial speed of 20 m/min, which is slowed down to 10 m/min in the latter half of the weighing. Other materials subsequently supplied in small quantities are carried at a speed of 10 m/min.

In still another embodiment of the present invention shown in FIGS. 13 to 20, materials are discharged on to the immovable conveyor surface (weighing surface) of a conveyor scale and are moved by a plurality of movable scrapers.

Figure 13:
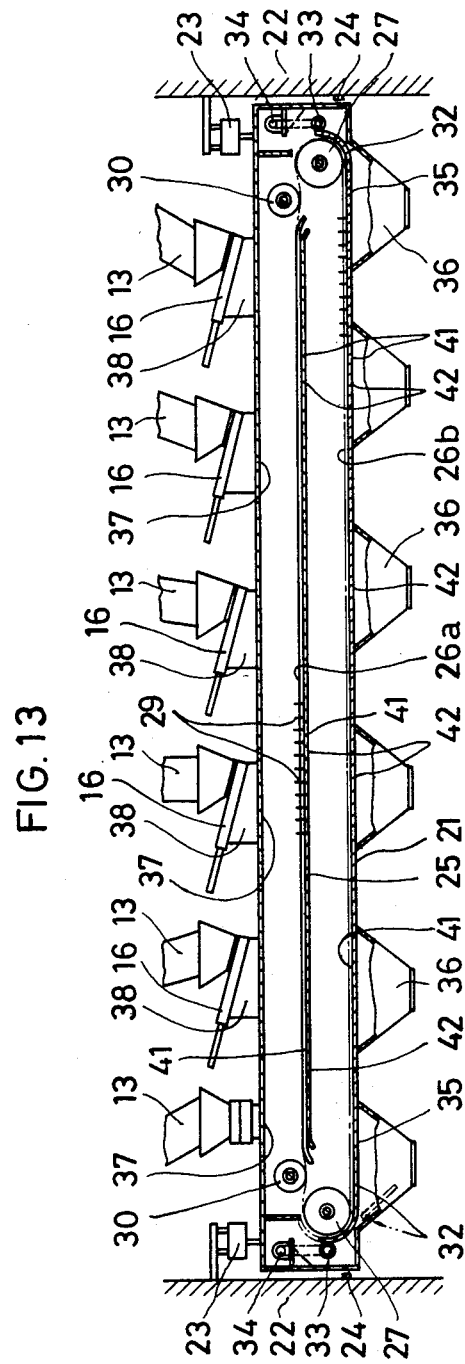
FIG. 13 is a vertical sectional view of another embodiment of the present invention.

As shown in FIG. 13, an outer frame 21 in the shape of a square tube is supported between walls 22 by means of weight detectors 23 such as load cells. Buffers 24 such as shock absorbing rubber are provided on the walls 22 opposite to the end faces of the outer frame 21.

Figure 14:
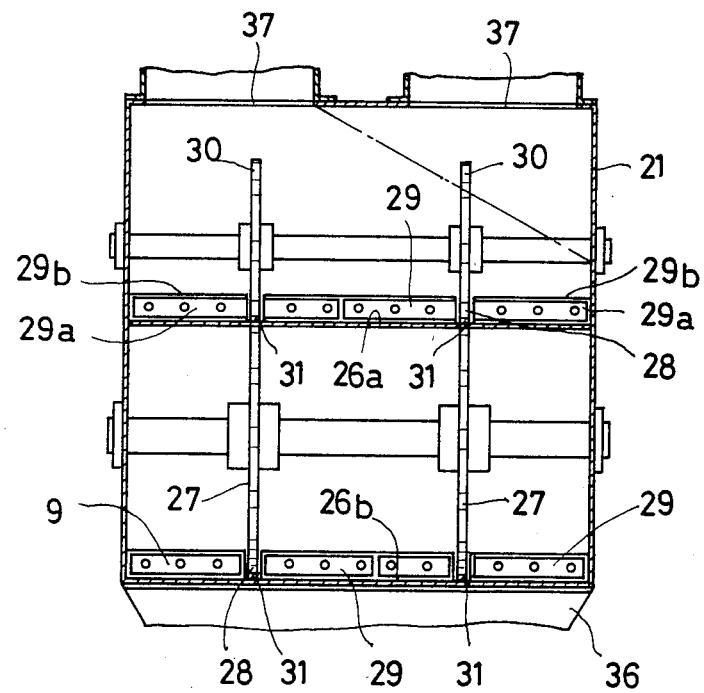
FIG. 14 is an enlarged vertical sectional side view thereof.

A horizontal plate 25 is provided in the center of the outer frame 21 with spaces left between the ends of the plate 25 and the end faces of the outer frame 21. The upper surface 26a of the plate 25 constitutes an upper conveyor surface, while the interior bottom surface 26b of the outer frame 21 constitutes a lower conveyor surface. A pair of sprocket wheels 27 are provided at each end of the interior of the outer frame 21. (FIG. 14) One of these two pairs of sprocket wheels 27 is driven by a motor (not shown) mounted on the outer frame 21. A roller chain 28 passes around each pair of the sprocket wheels. Each roller chain 28 is kept taut by a tension sprocket wheel 30 and allowed to run on rails 31 mounted on the upper and bottom surfaces 26a and 26b as shown in FIG. 14 so that the roller chain 28 may be prevented from running out of true.

Figure 15:
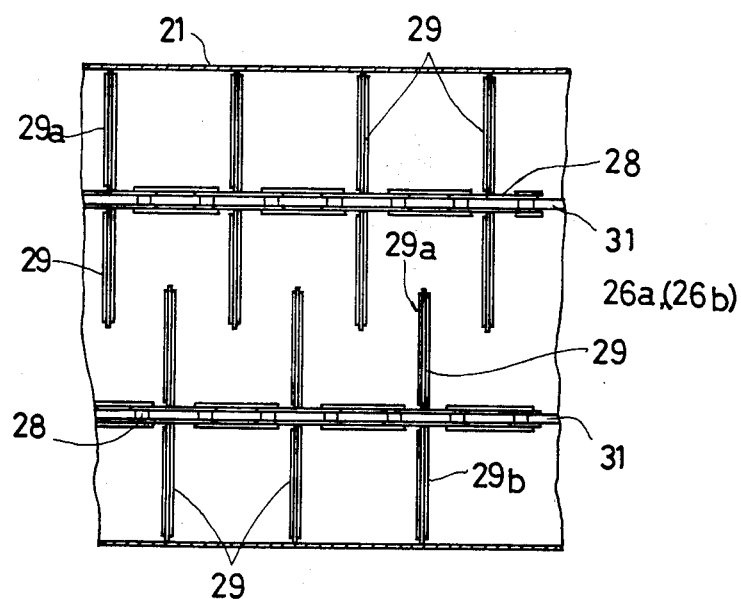
FIG. 15 is an enlarged horizontal sectional view of a part thereof.

Scrapers 29 are secured at regular intervals to the roller chains 28 so as to transversely extend therefrom in such a manner that the scrapers 29 extending toward each other between the two roller chains 28 are allowed to overlap each other as shown in FIG. 15. Each scraper 29 comprises a board 29a secured to the roller chain 28 and covered with a rubber sheet 29b.

Figure 16:
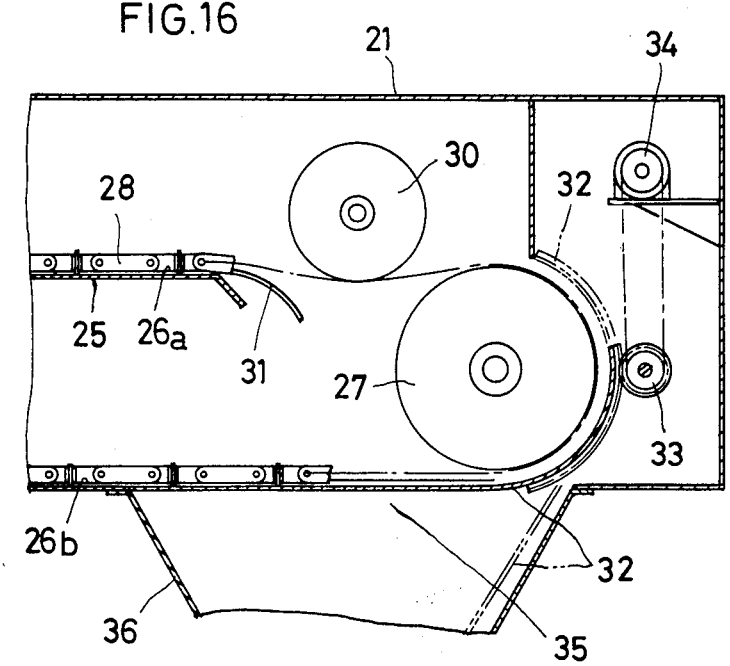
FIGS. 16, 17 and 19 are enlarged views of parts thereof.
Figure 17:
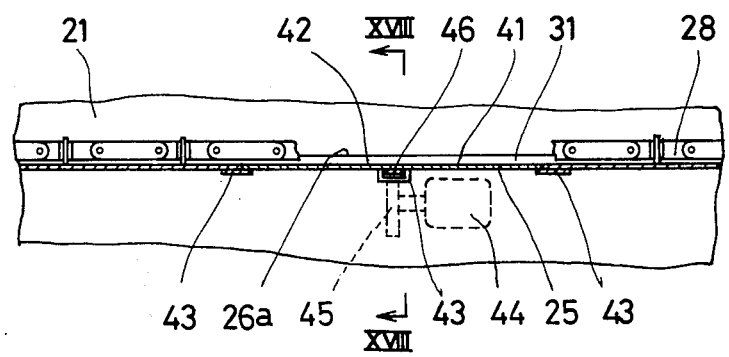
Figure 18:
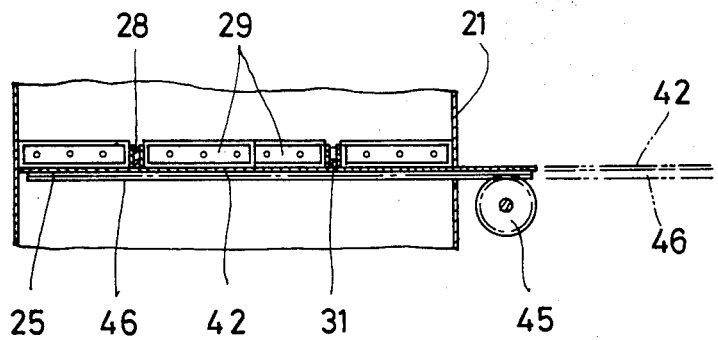
FIG. 18 is a sectional view taken along line XVIII—XVIII of FIG. 17.
Figure 19:
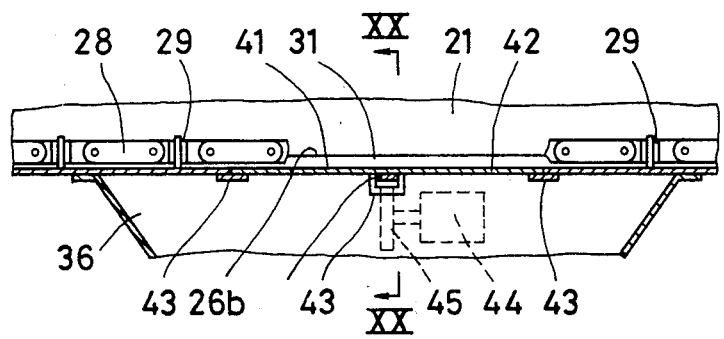
Figure 20:
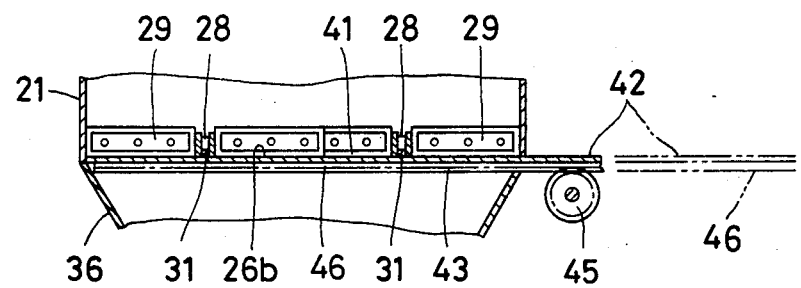
FIG. 20 is a sectional view taken along line XX—XX of FIG. 19.

A guide plate or block plate 32 is provided along the periphery of each pair of sprocket wheels 27 as shown in FIGS. 13 and 16, and is adapted to be moved upwardly therealong by a gear 33 when it is driven by a motor 34. A discharge port 35 is provided in each end portion of the bottom of the outer frame 21. Either one of these two discharge ports 35 is opened when the block plate 32 is moved to a position shown by dot-dash lines in FIG. 16. The material which has been weighed can be carried out of either end of the outer frame 21 by opening either one of the two discharge ports 35 with the other closed.

Discharge ports 41 are provided in the plate 25 and between the two discharge ports 35 in the bottom plate of the outer frame 21. Each port 41 is provided with a block plate 42 having a size corresponding to the port 41. As shown in FIGS. 17 to 20, the block plate 42 is driven by a motor 44 through a rack 46 and a pinion 45 so as to transversely move along a pair of guides 43 and thereby open and close the discharge port 41.

When conveying the material for discharge, the distance to be covered by the scrapers 29 can be reduced by opening a port properly selected from among the discharge ports 35 and 41.

Discharge hoppers 36 are provided at the discharge ports 35 and 41 provided in the bottom plate of the outer frame 21 (i.e., in the return conveyor surface 26b). When a block plate 32 or 42 is opened, the material which has been weighed is allowed to flow out. The discharge port of each hopper 36 can be freely opened and closed by a damper or the like so that the material may be discharged from any hopper and the remaining hoppers may serve as storage tanks.

Figure 1:
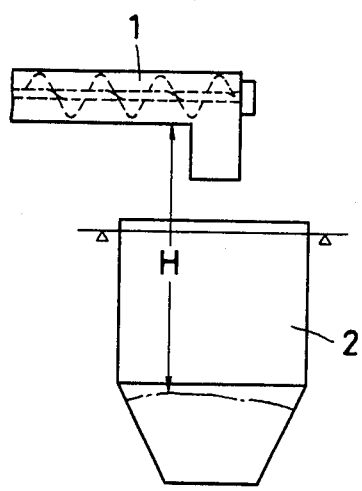
FIG. 1 is a schematic illustration of a conventional weighing apparatus.
Figure 2:
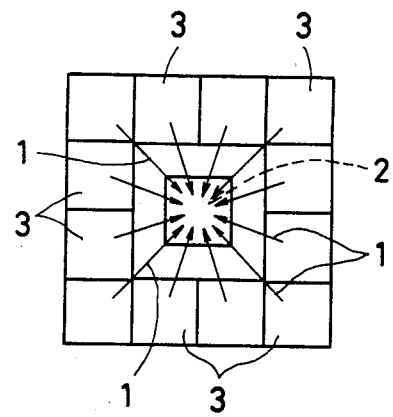
FIGS. 2 and 3 are schematic plan views of conventional weighing apparatuses.
Figure 3:
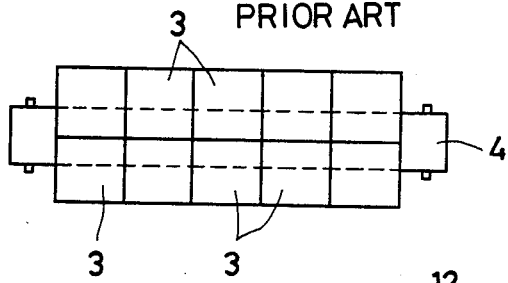
Figure 4:
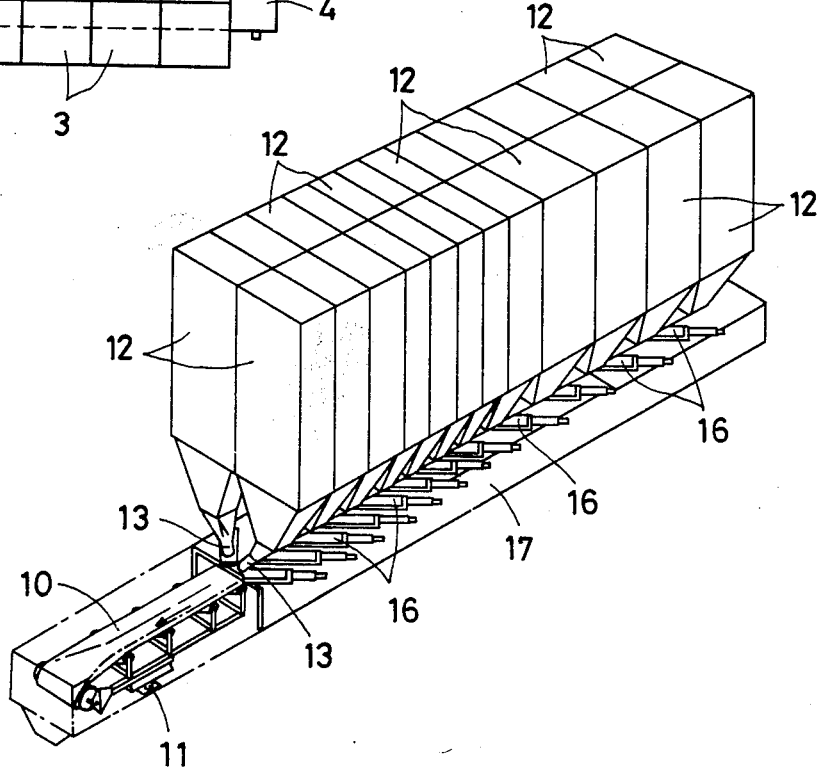
FIG. 4 is a perspective view of an embodiment of the present invention.

Through the damper 16 and a bellows 38, the discharge pipe 13 of each material tank 12 (FIG. 4) is connected to an inlet port 37 provided in the top plate of the outer frame 21. In the same manner as is the case with the first embodiment, the length of the discharge pipe 13 is determined so that the material remaining above the inlet port 37 may exert a constant pressure on the conveyor surface.

The outer frame 21 of this embodiment is box-shaped and tightly sealed except at both ends. Therefore, one need not worry about the scattering of a material to be weighed and the distance from the inlet ports 37 to the weighing surface 26a may be left out of consideration.

In operation of this embodiment, any damper 16 may be opened. Then the material to be weighed falls from the inlet port 37 and is stacked on the upper surface 26a of the plate 25 as shown by a dot-dash line in FIG. 14. The material stops flowing out of the inlet port 37 when it blocks up the inlet port 37.

When the roller chains 28 are driven, the material is moved by the scrapers 29. Consequently, the inlet port 37 gets unblocked so that additional material is allowed to fall on to the upper surface 26a. As long as the scrapers 29 move, the material continues to be discharged from the inlet port 37. The material falls on to the lower conveyor from either end of the plate 25. Then the material is weighed in the same manner as is the case with the first embodiment.

The distance to be covered by the scrapers 29 can be reduced and the energy required for driving the roller chains 28 can be saved by opening the discharge port 41 disposed downstream but nearest to the discharge pipe 13 through which the material has been supplied.

Figure 21:
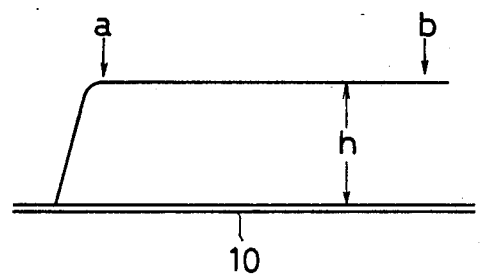
FIG. 21 is a diagram explaining how the materials are stacked on a conveyor.

In case of the first and second embodiments, the height h of the first material a remains unchanged as shown in FIG. 21 until the material a reaches the position where the second material b is to be supplied on top thereof. Consequently, the material b has to be dropped either from a place higher than the upper surface of the material a or in the rear of the material a.

Figure 22:
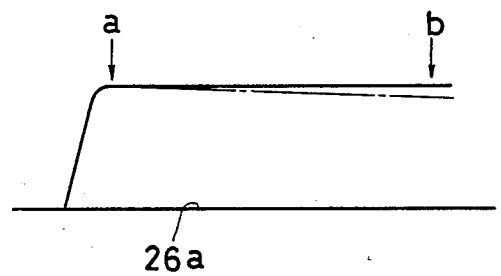
FIG. 22 is a diagram explaining how the materials are stacked on a horizontal baffle plate.

In case of the third embodiment, however, the upper surface of the first material a descends in a gradual slope as shown in FIG. 22 as the material a is moved by the scrapers 29. Therefore, the second material b can be supplied on top of the material a without waiting for the material a to pass an inlet port 37 from which the material b is to be supplied.

By opening any one of the block plates 32 and 42, the material which has been weighed is dropped into one of the discharge hoppers 36 and stored therein. The block plate 32 or 42 of another hopper 36 may also be opened when a single hopper 36 is not enough to admit all the material which has been weighed.

In place of the roller chains 28, wire ropes or the like may be used. If the direction of rotation of the sprocket wheels 27 can be reversed so that either direction may be properly selected according to circumstances, the distance between the inlet port 37 from which the material was supplied and the discharge port 35 or 41 from which the material is to be discharged can be reduced.

The third embodiment of the present invention may be provided only with the upper conveyor surface 26a, and the lower or return conveyor surface 26b may be omitted. In this case, the discharge hoppers 36 may be provided at the discharge ports 41 provided in the horizontal plate 25.

Reversibility is essential for the direction of rotation of the sprocket wheels 27 if the third embodiment of the present invention is provided only with the upper conveyor surface 26a and yet the discharge ports 35 are provided in both end portions thereof.

It goes without saying that in the first and second embodiments of the present invention, a screw conveyor or any other conveyor may be used in place of the belt conveyor 10.

What are claimed are:

1. A method for weighing a bulk material, comprising the steps of:

supplying the material from a supply port disposed over a conveyor surface on to said conveyor surface until said supply port gets blocked by the material itself, moving said conveyor surface so that the material will fall through said supply port continuously and so that the pressure applied by the material above said supply port to said conveyor surface will be constant and while measuring the weight of the material stacked on said conveyor surface, and shutting said supply port as soon as the weight of the material reaches a predetermined value.

2. An apparatus for weighting and batching a bulk material, comprising:

a conveyor scale comprising a conveyor for stacking the material thereon and weight detector means for weighing said conveyor and the material stacked thereon, a material supply port disposed over the surface of said conveyor by such a distance that the material supplied from said supply port will not spill off said conveyor surface, damper means on said supply port for shutting said material supply port as soon as the weight of the material stacked on said conveyor surface reaches a predetermined value and controller means for reopening and reclosing said damper means until the weight of the material stacked on said conveyor surface remains at said predetermined weight value with said damper means closed and for reopening said damper means for commencing to discharge material onto said conveyor for the next batch as the weighed first batch is being discharged from said conveyor.

3. The apparatus as claimed in claim 2, wherein said conveyor comprises a belt conveyor and said weight detector means comprises a load cell.

4. The apparatus as claimed in claim 2, wherein said conveyor comprises a plate on which the material has been stacked, and an endless member carrying a plurality of scraper means extending transversely for scraping the material stacked on said plate to enable the material to fall continuously through said material supply port until said predetermined value is reached.

5. An apparatus for weighting and batching a bulk material, comprising:

a conveyor scale comprising a conveyor for stacking the material thereon and weight detector means for weighing said conveyor and the material stacked thereon, a material supply port disposed over the surface of said conveyor by such a distance that the material supplied from said supply port will not spill off said conveyor surface, said conveyor including a plate on which the material from said material supply port is stacked and an endless member carrying a plurality of scraper means extending transversely for scraping the material stacked on said plate to enable the material to fall continuously through said material supply port until said material reaches a predetermined value, damper means on said supply port for shutting said material supply port as soon as the weight of the material stacked on said conveyor surface reaches a predetermined value and controller means for reopening and reclosing said damper means until the weight of the material stacked on said conveyor surface remains at said predetermined weight value with said damper means closed and for reopening said damper means for commencing to discharge material onto said conveyor for the next batch as the weighed first batch is being discharged from said conveyor, said conveyor further including an upper conveying surface and a lower conveying surface, the material on the upper conveying surface being adapted to fall on to the lower conveying surface from at least one end thereof, said endless member running along said upper and lower conveying surfaces.

6. The apparatus as claimed in claim 5, wherein said upper conveying surface is formed with a discharge port which can be selectively opened and closed as desired.

7. The apparatus as claimed in claim 4, wherein said endless member can be driven in either direction.

8. The apparatus as claimed in claim 2, wherein said damper means is adapted to be shut in a direction in which said conveyor is driven.

* * * * *